United States Patent Office 3,014,173
Patented Dec. 19, 1961

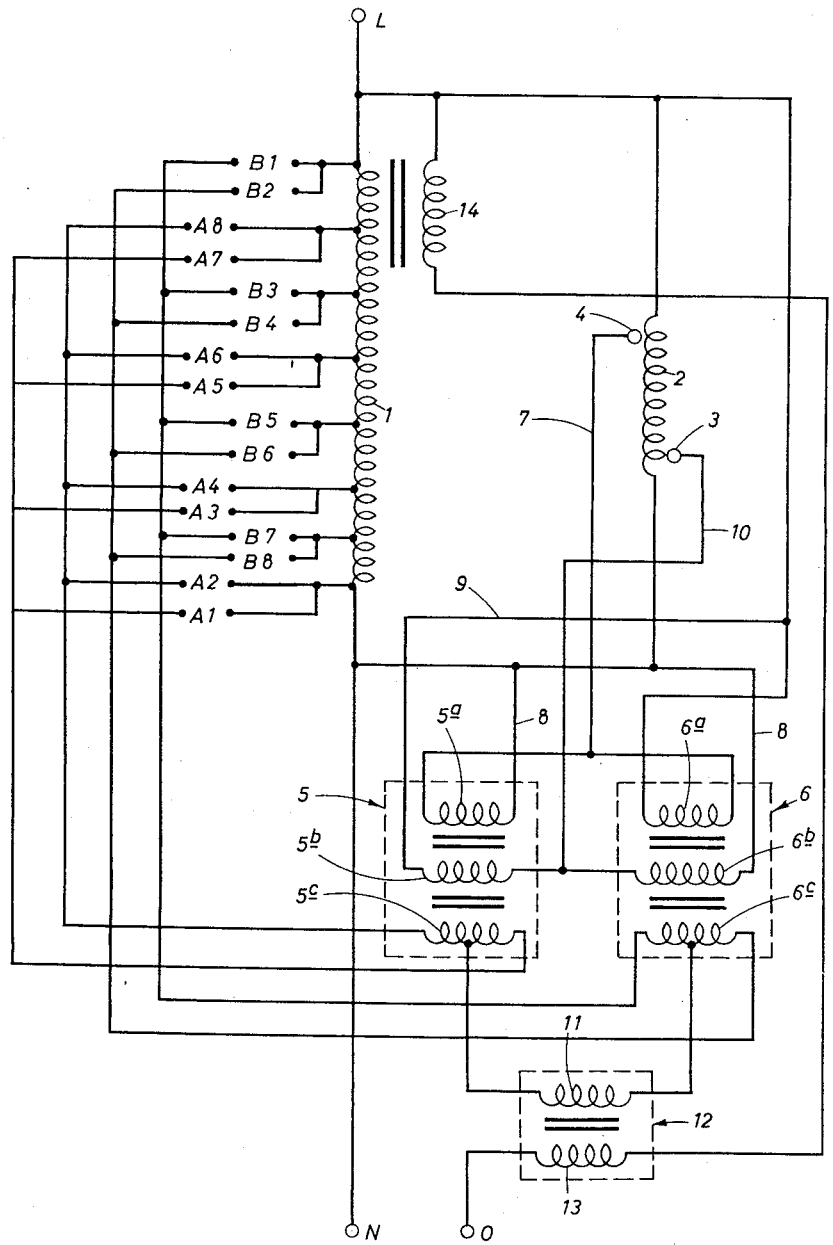

3,014,173
ELECTRICAL CONTROL SYSTEMS
Leonard John Martin, Three Bridges, and George Kello Ballantyne, Horsham, England, assignors to Brentford Transformers Limited
Filed Sept. 20, 1960, Ser. No. 57,265
Claims priority, application Great Britain June 8, 1960
3 Claims. (Cl. 323—45)

The present invention relates to improvements in electrical control systems.

It is well known in the art that tapped transformers, whether of the single or double wound type, are very useful for providing the main control in electrical control systems, but that they suffer from the inherent defect that the control which is obtained must of necessity to a coarse control, for the minimum change in voltage normally corresponds to the voltage difference between taps. On the other hand, continuously variable or stepless control devices are known, for example regulators, which have the inherent advantage of providing a smoothly regulated output voltage but which also have the inherent disadvantage of being expensive and large for any given power handling capacity. Consequently proposals have been made for associating a tapped transformer with a continuously variable device in order to reduce the overall size and cost of the apparatus whilst effectively increasing the load handling capacity, and it is an object of the present invention to provide a control system of this latter type.

According to the present invention there is provided an electrical control system comprising a tapped transformer in association with a continuously variable voltage control device adapted to provide two voltages changing oppositely in synchronism; a pair of transformers each having two primary windings, said windings being respectively fed with the two voltages from the voltage control device, each of said transformers also having a centre tapped secondary winding and the ends of these secondary windings being adapted for selective connection to the taps of the tapped transformer and the centre tappings being connected through the primary winding of an output transformer.

Thus it will be observed that the voltages induced in the primary winding of the output transformer will depend upon the direction of current flow through the associated secondary windings of the treble wound transformers and also upon the direction and magnitude of the current flow through the two primary windings of each of these transformers. By means of the system of this invention the voltage as delivered by the output transformer can be smoothly controlled. Moreover the maximum power dissipated by the variable voltage control device is only required to correspond to the voltage between tapping points on the main transformer, whereby it can be relatively small in size.

It will be appreciated that although the variable voltage control device, which may conveniently be a regulator, may deliver the same voltages to the primary windings of the treble wound transformers, the bucking and boosting voltages developed at the tapping points will not necessarily be the same, for they will depend upon the connections made to the ends of the secondary windings of these transformers.

In order that the present invention may more readily be understood, one embodiment of the same will now be described by way of example and with reference to the accompanying drawing which illustrates diagrammatically the circuit of the present invention.

Referring now to the drawing, it will be seen that a main tapped transformer 1 is provided, this transformer being connected between the live and neutral lines L and N respectively. The transformer 1 is provided with a plurality of tapping points and connected to these tapping points (8 of which are shown) are switch contacts A1 to A8 and B1 to B8, there being two switches associated with each tapping point as will be clear. The switch contacts are grouped together in four groups of four and a typical group consists of the contacts marked A1, A3, A5 and A7. Also provided is an on-load regulator 2 which has a pair of contacts 3 and 4, these contacts being movable oppositely in synchronism in the well known manner, tracking a bared contact strip on the regulator winding.

A pair of static transformers 5 and 6 are provided and each of these static transformers includes two primary windings 5a, 5b and 6a, 6b respectively and a secondary winding 5c or 6c respectively which is centre tapped. The windings 5a and 6a are connected together in series and the connection point is connected by a lead 7 to the contact 4. The other end of the winding 5a is connected by a lead 8 to the neutral supply line N and the other end of the winding 6a is connected by a lead 9 to the live supply line L. The windings 5b and 6b are also connected in series and the connection point is taken by a lead 10 to the contact 3. The other end of the winding 5b is connected by the line 8 to the live supply line L whilst the other end of the winding 6b is connected to the neutral supply line N via a lead 8'.

One end of the secondary winding 5c is connected to the switch contact group A1 whilst the other end of this winding is connected to the switch contact group A2. Similarly one end of the secondary winding 6c is connected to the switch contact group B1 whilst the other end is connected to the switch contact group B2. The centre points of the secondary windings 5c and 6c are connected together via a primary 11 of an output transformer 12. The secondary winding 13 of the output transformer 12 is connected at one side to the live line L via a secondary winding 14 of the main transformer winding 1 and the output is taken from between the other end of the winding 13 and the neutral line N.

It should be noted that in the drawing, for the sake of clarity, the regulator 2 is shown as connected in parallel with the transformer 1 but obviously any suitable source of power supply may be provided for this regulator.

In order to explain the function of the apparatus, it may be assumed that the apparatus is delivering minimum voltage at the output and consequently maximum buck is applied to the winding 11. The contacts 3 and 4 on the regulator 2 may be in the position shown.

In order to provide this maximum buck, the selector switch contacts A1 and B2 will be closed and it will be observed that the regulator contacts 3 and 4 are in such a position as to deliver the maximum voltage to the transformer 5 and the connections to the secondary 5c of this transformer being from the contact A1 are such that the voltage corresponding to this minimum tapped voltage is bucked by a voltage equivalent to the maximum delivered by the regulator, namely the voltage between the adjacent taps on the winding 1. No voltages are induced in the transformer 6 as can be clearly seen so that the voltage presented to the output transformer 12 is that corresponding to the voltage of the tapping B2.

To raise the output voltage, the contacts 3 and 4 on the regulator 2 are moved progressively to the opposite ends of the winding so as to induce a steadily decreasing voltage in the primaries 5a and 5b of the transformer 5 and a steadily increasing voltage in the primaries of the transformer 6 until, when the contacts have reached their opposite end positions, zero voltage is induced in the primaries of the transformer 5 and maximum voltage is induced in the primaries of the transformers 6.

At this stage the contact A2 is closed and the contact A1 is opened, thus reversing the direction of effective boost and buck in the transformer 5, but of course this change takes place at zero effective volts. At the same time the contact B2 is opened and the contact B3 is closed, reversing the direction of current flow through the secondary of the transformer 6 and changing it from maximum boost to maximum buck but giving no effective change in output as the induced voltage is equal to half the voltage between tapping points on the main winding 1.

The contacts on the regulator 2 may now be run to the opposite ends so decreasing the buck applied to the tapping connected by the switch contact B3 and increasing the boost applied to the tapping connected into circuit by the contact A2.

This sequence may continue until the maximum voltage is delivered by the apparatus.

It will be understood that if the voltage between the live and neutral lines L and N respectively is 210 volts, then in the arrangement shown in the drawings, the voltage between tappings on the main winding 1 will be approximately 30 volts and this voltage is delivered by the secondary windings 5c and 6c of the transformers 5 and 6. The voltage across the regulator 2 is also 210 volts and in the end position of the contacts 3 and 4 these apply voltages of approximately 210 volts to the respective primary windings of the transformers 5 and 6. However, the turns ratio of these transformers 5 and 6 are such that the voltages induced in the secondary windings by the primary windings are 30 volts at the maximum, that is to say, equal to the intertap voltage. Obviously if a different source of supply is provided for the regulator winding a different turns ratio is necessary.

We claim:

1. An electrical control system comprising a tapped transformer in association with a continuously variable voltage control device adapted to provide two voltages changing oppositely in synchronism; a pair of transformers each having two primary windings, said windings being respectively fed with the two voltages from the voltage control device, each of said transformers also having a centre tapped secondary winding and the ends of these secondary windings being adapted for selective connection to the taps of the tapped transformer and the centre tappings being connected through the primary winding of an output transformer.

2. An electrical control system comprising a first voltage control device, means with said first voltage control device to deliver two continuously variable voltages changing oppositely in synchronism, a second voltage control device, means with said second voltage control device to deliver two discretely variable voltages, first and second triple-wound transformers each having first and second primary windings and a center-tapped secondary winding, means delivering to said primary windings respectively said two continuously variable voltages, means delivering to said secondary windings said discretely variable voltages, a double-wound transformer having primary and secondary windings, and means connecting the primary winding of said double-wound transformer to the center-taps of said secondary windings of said two triple-wound transformers, the output voltage being drawn from the secondary winding of said double-wound transformer.

3. The system of claim 2, in which a winding electromagnetically coupled to said second voltage control device delivers a voltage to the secondary winding of said double-wound transformer.

No references cited.